US012045352B2

(12) United States Patent
Yamazaki et al.

(10) Patent No.: US 12,045,352 B2
(45) Date of Patent: Jul. 23, 2024

(54) ELECTRONIC CONTROL DEVICE AND CONTROL METHOD

(71) Applicant: Hitachi Astemo, Ltd., Hitachinaka (JP)

(72) Inventors: Hiroki Yamazaki, Tokyo (JP);
Momoka Kasuya, Tokyo (JP);
Nobuyoshi Morita, Hitachinaka (JP);
Yasuhiro Fujii, Hitachinaka (JP);
Mikio Kataoka, Hitachinaka (JP);
Masaki Fujiwara, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 50 days.

(21) Appl. No.: 17/928,050

(22) PCT Filed: Feb. 5, 2021

(86) PCT No.: PCT/JP2021/004439
§ 371 (c)(1),
(2) Date: Nov. 28, 2022

(87) PCT Pub. No.: WO2021/250939
PCT Pub. Date: Dec. 16, 2021

(65) Prior Publication Data
US 2023/0214494 A1 Jul. 6, 2023

(30) Foreign Application Priority Data
Jun. 11, 2020 (JP) .................. 2020-101786

(51) Int. Cl.
*G06F 9/44* (2018.01)
*G06F 9/4401* (2018.01)
*G06F 21/57* (2013.01)

(52) U.S. Cl.
CPC .......... *G06F 21/575* (2013.01); *G06F 9/4401* (2013.01); *G06F 2221/034* (2013.01)

(58) Field of Classification Search
CPC ..................................... G06F 9/44; G06F 1/12
See application file for complete search history.

(56) References Cited

U.S. PATENT DOCUMENTS

| 2012/0117566 | A1* | 5/2012 | Maeda .................. G06F 21/556 |
| | | | 718/1 |
| 2017/0255384 | A1 | 9/2017 | Hashimoto et al. |

(Continued)

FOREIGN PATENT DOCUMENTS

| JP | 2015-225376 A | 12/2015 |
| JP | 2017-156945 A | 9/2017 |

OTHER PUBLICATIONS

International Search Report with English Translation and Written Opinion dated Apr. 27, 2021 in corresponding International Application No. PCT/JP2021/004439.

*Primary Examiner* — Keshab R Pandey
(74) *Attorney, Agent, or Firm* — Foley & Lardner LLP

(57) ABSTRACT

An electronic control device includes a tamper storage unit that stores a secure boot key and a control key, and has tamper resistance, a processor that is able to execute a program, a verification unit that verifies a program by using the secure boot key, performs secure boot causing the processor to execute the program based on a result of the verification, and has tamper resistance, a calculation unit that performs calculation related to encryption using the control key, and has tamper resistance, and a general storage unit that stores a first program that implements a delegated verification unit to which authority of the secure boot is delegated from the verification unit and a second program that implements a control unit that uses the calculation unit, and does not have tamper resistance. The verification unit delegates the authority of the secure boot to the delegated verification unit to end the execution of the secure boot when the verification for the first program and the second program (Continued)

is successful and the processor is caused to execute the first program and the second program, the calculation unit starts an operation when the verification unit ends the execution of the secure boot, and the delegated verification unit is able to simultaneously execute processing with the calculation unit.

6 Claims, 6 Drawing Sheets

(56) References Cited

U.S. PATENT DOCUMENTS

2018/0157841 A1    6/2018   Shin et al.
2018/0196945 A1*  7/2018   Kornegay ............... G06F 21/57

* cited by examiner

ELECTRONIC CONTROL DEVICE AND CONTROL METHOD

TECHNICAL FIELD

The present invention relates to an electronic control device and a control method.

BACKGROUND ART

Secure boot has been known as a technology capable of updating a program and preventing falsification of the program. PTL 1 discloses an information processing apparatus that is able to execute secure boot. The information processing apparatus includes a nonvolatile memory including a first nonvolatile memory region in which a program is stored and a second nonvolatile memory region in which a first flag having a first value indicating that the program is unverified or a second value indicating that the program is verified is stored, and a storage device that stores a second flag having a third value indicating that rewriting to the first nonvolatile memory region is prohibited or a fourth value indicating that the rewriting is permitted. The information processing apparatus includes a permission unit that changes a value of the first flag to the first value in a case where a rewriting permission request is received and the first flag has the second value, and changes the second flag to the fourth value in accordance with the change of the first flag, a determination unit that determines that it is necessary to verify the program in a case where the first flag has the first value at the time of activation of the information processing apparatus, and determines that it is not necessary to verify the program in a case where the first flag has the second value at the time of activation of the information processing apparatus, and a verification unit that controls the permission unit to change the second flag to the third value in a case where a verification request is received or a case where it is necessary to verify the program, verifies the program in accordance with the change of the second flag, and skips the verification for the program in a case where it is not necessary to verify the program.

CITATION LIST

Patent Literature

PTL 1: JP 2017-156945 A

SUMMARY OF INVENTION

Technical Problem

In the invention described in PTL 1, it is not possible to simultaneously execute secure boot and calculation related to encryption.

Solution to Problem

An electronic control device according to a first aspect of the present invention includes a tamper storage unit that stores a secure boot key and a control key, and has tamper resistance, a processor that is able to execute a program, a verification unit that verifies a program by using the secure boot key, performs secure boot causing the processor to execute the program based on a result of the verification, and has tamper resistance, a calculation unit that performs calculation related to encryption using the control key, and has tamper resistance, and a general storage unit that stores a first program that implements a delegated verification unit to which authority of the secure boot is delegated from the verification unit and a second program that implements a control unit that uses the calculation unit, and does not have tamper resistance. The verification unit delegates the authority of the secure boot to the delegated verification unit to end the execution of the secure boot when the verification for the first program and the second program is successful and the processor is caused to execute the first program and the second program, the calculation unit starts an operation when the verification unit ends the execution of the secure boot, and the delegated verification unit is able to simultaneously execute processing with the calculation unit.

A control method according to a second aspect of the present invention is a control method executed by an electronic control device that includes a tamper storage unit that stores a secure boot key and a control key, and has tamper resistance, a processor that is able to execute a program, a verification unit that verifies a program by using the secure boot key, performs secure boot causing the processor to execute the program based on a result of the verification, and has tamper resistance, a calculation unit that performs calculation related to encryption using the control key, and has tamper resistance, and a general storage unit that stores a first program that implements a delegated verification unit to which authority of the secure boot is delegated from the verification unit and a second program that implements a control unit that uses the calculation unit, and does not have tamper resistance. The method includes delegating, by the verification unit, the authority of the secure boot to the delegated verification unit to end the execution of the secure boot when the verification for the first program and the second program is successful and the processor is caused to execute the first program and the second program, starting, by the calculation unit, an operation when the verification unit ends the execution of the secure boot, and being able to simultaneously execute, by the delegated verification unit, processing with the calculation unit.

Advantageous Effects of Invention

According to the present invention, the secure boot and the calculation related to encryption can be simultaneously executed.

DESCRIPTION OF EMBODIMENTS

First Embodiment

A first embodiment of an electronic control device will be described with reference to FIGS. 1 to 5.

(Hardware Configuration Diagram)

Figure 1:
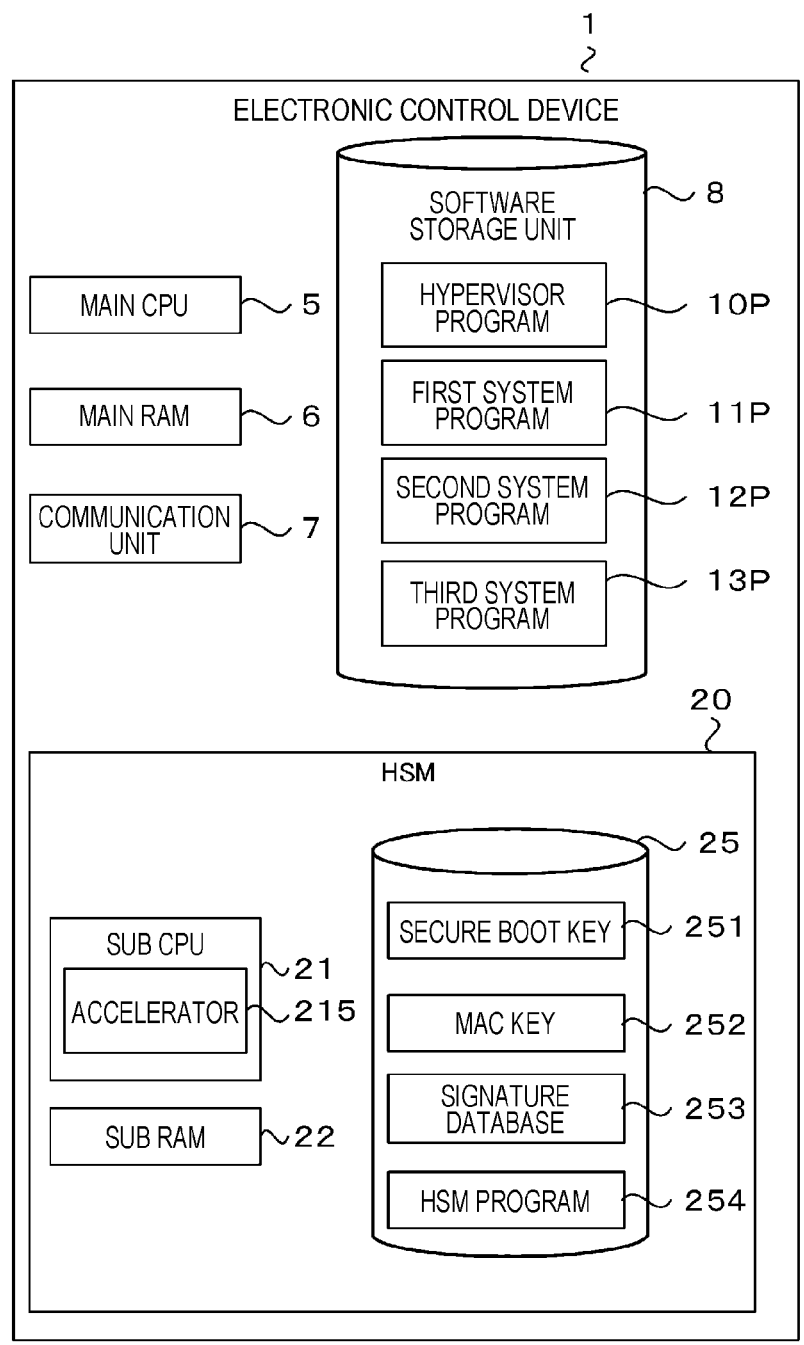
FIG. 1 is a hardware configuration diagram of an electronic control device.

FIG. 1 is a hardware configuration diagram of an electronic control device according to the present invention. The electronic control device 1 includes a central processing unit main CPU 5, a main RAM 6, a communication unit 7, a software storage unit 8, and an HSM 20 which is a hardware security module. The electronic control device 1 is mounted on a vehicle, for example.

The software storage unit 8 stores a hypervisor program 10P, a first system program 11P, a second system program 12P, a third system program 13P, and other programs. Other programs not illustrated in FIG. 1 for the sake of convenience in illustration are, for example, a fourth system program and a fifth system program. Unlike a tamper storage unit 25 to be described later, since the software storage unit 8 does not ensure a tamper property, the software storage unit 8 can be referred to as a "general storage unit" by comparison with a storage device having a tamper property.

The hypervisor program 10P is software for controlling a virtual environment. Each of a first system 11, a second system 12, and a third system 13 is an individual virtual environment and includes a plurality of pieces of software. In addition, four or more systems, for example, a fourth system and a fifth system may be stored in the software storage unit 8.

The main CPU 5 is a central processing unit, and loads and executes a program stored in the software storage unit 8 into the main RAM 6. However, since the software storage unit 8 is rewritable and there is a possibility that the program stored in the software storage unit 8 is rewritten, the main CPU 5 executes only a verified program as will be described later. The main RAM 6 is a rewritable memory. The communication unit 7 exchanges data with an outside of the electronic control device 1. However, as will be described later, the communication unit 7 stops communication with the outside when a communication suppression command is received from the HSM 20, and starts communication with the outside when a suppression release command is received. The software storage unit 8 is a rewritable storage device, for example, a hard disk drive or a flash memory.

The HSM 20 includes a sub CPU 21, a sub RAM 22, and a tamper storage unit 25. The HSM 20 is a processing unit in which a tamper property is secured. The sub CPU 21 is a central processing unit, and loads and executes a program stored in the tamper storage unit 25 into the sub RAM 22. The sub CPU 21 incorporates an accelerator 215 capable of executing calculation related to encryption at a high speed, and can execute verification processing and MAC calculation processing to be described later at a high speed. The accelerator 215 calculates, for example, an AES-CMAC or SHA-256 hash at a high speed.

Note that, "sub" attached to the name of the sub CPU 21 is hardware different from the main CPU 5, has a low calculation processing speed, and merely indicates that a circuit scale of the sub CPU 21 tends to be smaller than a circuit scale of the main CPU 5. That is, the sub CPU 21 does not mean a part of the main CPU 5, and does not limit that an architecture of the sub CPU 21 is a subset of the main CPU 5. In addition, the calculation processing speed of the sub CPU 21 may be faster than an operation processing speed of the main CPU 5, and the circuit scale of the sub CPU 21 may be larger than the circuit scale of the main CPU 5.

The sub RAM 22 is a rewritable memory. The "sub" attached to the name of the sub RAM 22 merely indicates that a capacity tends to be smaller than a capacity of the main RAM 6. That is, the sub RAM 22 may have a larger capacity than the main RAM 6.

The tamper storage unit 25 is a storage device in which a tamper property is secured, and is, for example, a storage device capable of writing only once. Since the tamper property is secured, the tamper storage unit 25 can also be referred to as a "tamper storage unit". The tamper storage unit 25 stores a secure boot key 251, a MAC key 252, a signature database 253, and an HSM program 254. The secure boot key 251 is key information used for verifying secure boot. The MAC key 252 is key information used to calculate a message authentication code (MAC). Note that, since the MAC key 252 is used to calculate a MAC of a message transmitted by a control unit 217 as will be described later, the "MAC key" can also be referred to as a "control key".

The signature database 253 is a database used to verify secure boot, and records a signature for each program. In the signature database 253, for example, a signature of each program created by using a secret key corresponding to the secure boot key 251 which is a public key is recorded. The HSM program 254 is a program for implementing a function to be described later.

(Functional Configuration Diagram)

Figure 2:
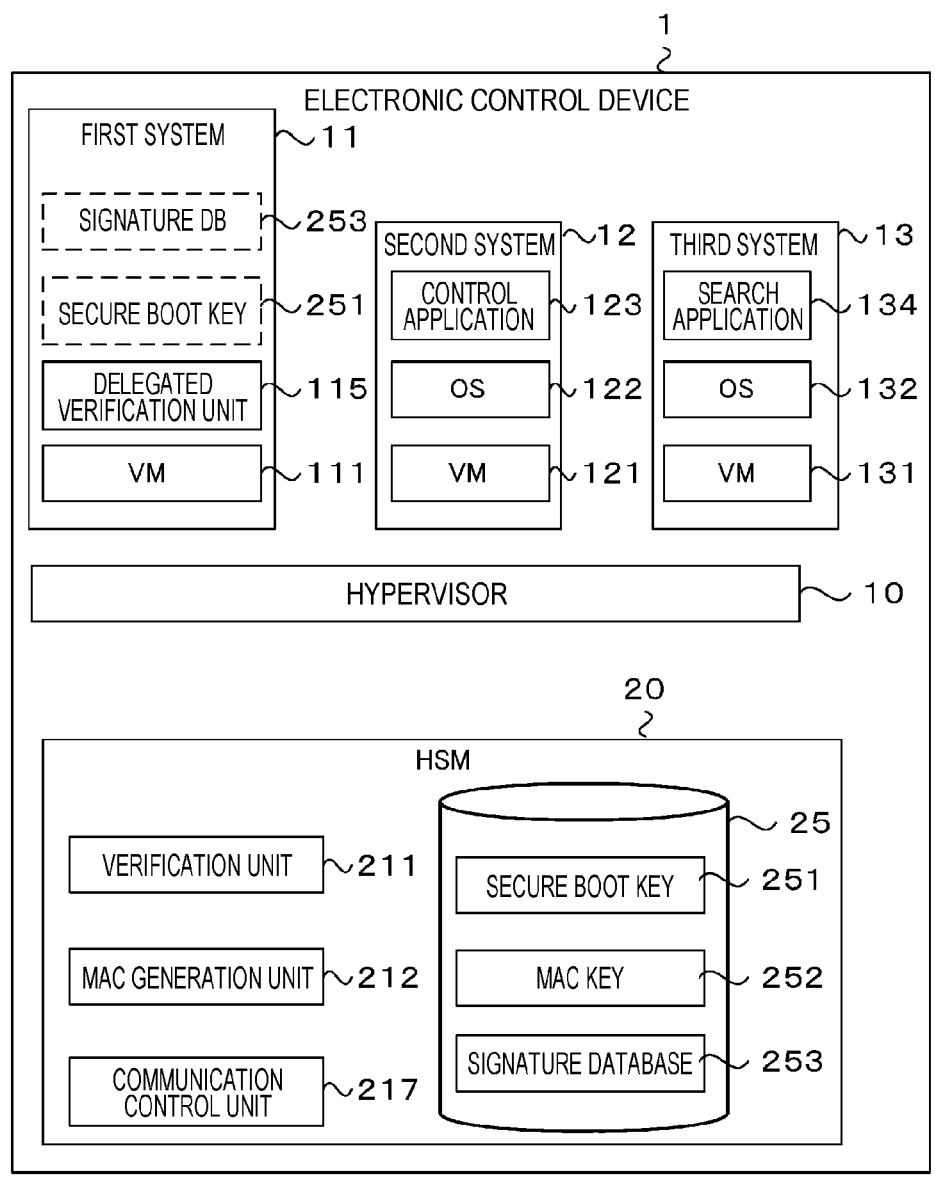
FIG. 2 is a functional configuration diagram of an electronic control device 1.

FIG. 2 is a functional configuration diagram of the electronic control device 1. The electronic control device 1 includes a hypervisor 10, and the first system 11, the second system 12, the third system 13, and other systems (not illustrated) that operate in a virtual environment provided by the hypervisor 10. The other systems are, for example, the fourth system and the fifth system.

The first system 11 includes a virtual machine (VM) 111 and a delegated verification unit 115. Note that, the first system 11 acquires the secure boot key 251 by processing to be described later. The second system 12 includes a VM 121, an operating system (OS) 122, and a control application 123. The third system 13 includes a VM 131, an OS 132, and a search application 134. Note that, the first system 11 may include the OS, or the second system 12 and the third system 13 may not include the OS.

The VM 111 and the delegated verification unit 115 of the first system 11 are implemented by the main CPU 5 loading and executing the first system program 11P into the main RAM 6. The VM 121, the OS 122, and the control application 123 of the second system 12 are implemented by the main CPU 5 loading and executing the second system program 12P into the main RAM 6. Since the control application 123 controls the vehicle on which the electronic control device 1 is mounted, it is desirable to activate and operate at an early stage.

The VM 131, the OS 132, and the search application 134 of the third system 13 are implemented by the main CPU 5 loading and executing the third system program 13P into the main RAM 6. The search application 134 may not require an operation at an early stage as compared with the control application 123, and there is a time lag from the activation of the electronic control device 1 to the start of the operation of the search application 134. In other words, the search application 134 has an importance lower than an importance of the control application 123.

The HSM 20 includes a verification unit 211, a MAC generation unit 212, and a communication control unit 217. The verification unit 211, the MAC generation unit 212, and the communication control unit 217 are implemented by the sub CPU 21 loading and executing the HSM program 254 into the sub RAM 22. As described above, since the HSM program 254 is stored in the tamper storage unit 25 having the tamper property, the verification unit 211, the MAC generation unit 212, and the communication control unit 217 implemented by the HSM program 254 also have a tamper property. Each of the verification unit 211 and the MAC generation unit 212 can perform processing at a high speed by using the accelerator 215. However, since the verification unit 211 and the MAC generation unit 212 occupy the accelerator 215 during the calculation, the verification unit and the MAC generation unit cannot be simultaneously executed.

The verification unit 211 verifies a program to be read before the main CPU 5 reads the program. When the verification by the verification unit 211 is successful, in other words, when the verification unit 211 determines that there is no problem in the program, the program is read by the main CPU 5. The verification unit 211 verifies each program by using the secure boot key 251. In addition, the verification unit 211 copies the secure boot key 251 and the signature database 253 to the first system 11 at a specific timing to be described later, and erases the secure boot key 251 and the signature database 253 copied to the first system 11 at another specific timing to be described later.

Verification of the program by the verification unit 211 will be described. The secure boot key 251 is, for example, a public key in a public key cryptosystem, and signature information signed for each program by using a private key is stored in the signature database 253. For example, the verification unit 211 reads signature information of a verification target program from the signature database 253, and verifies the program by using the secure boot key 251 and the read signature information. For example, the verification unit 211 determines that the verification is successful in a case where a character string obtained by decrypting the signature information by using the public key matches a hash value of the verification target program, and determines that the verification fails in a case where the character string does not match the hash value of the verification target program.

The MAC generation unit 212 executes calculation of generating a MAC, which is calculation related to encryption, by using the MAC key 252 with the character string received from the control application 123, the search application 134, or the like as input information, and outputs the generated MAC. The accelerator 215 is used to generate the MAC by the MAC generation unit 212.

The communication control unit 217 sets whether or not to accept communication from the outside of the electronic control device 1 to the communication unit 7. Specifically, when the electronic control device 1 is activated, the communication control unit 217 transmits an interruption command to the communication unit 7 to start communication interruption from the outside. In addition, the communication control unit 217 transmits a cancel command for ending the communication interruption from the outside to the communication unit 7 at a timing to be described later. That is, the communication unit 7 does not accept the communication from the outside of the electronic control device 1 for a predetermined period from the activation of the electronic control device 1 by the communication control unit 217.

(Time Chart)

Figure 3:
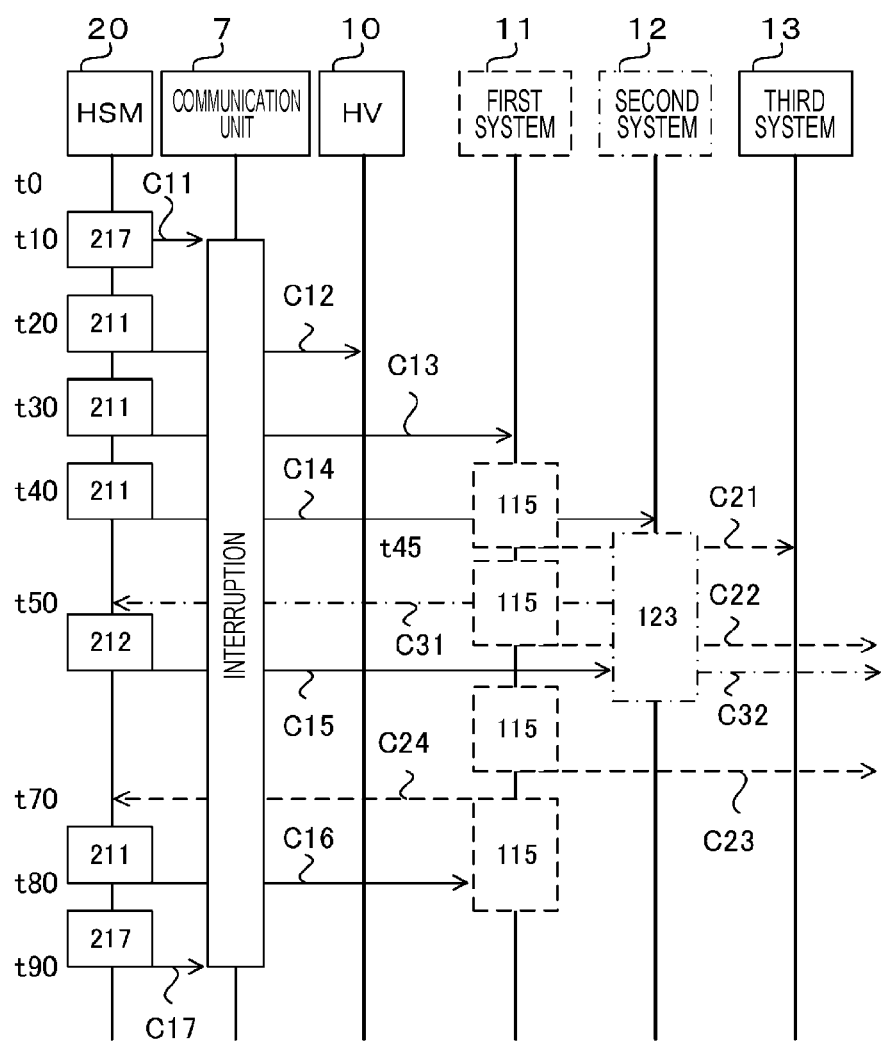
FIG. 3 is a time chart illustrating an operation of the electronic control device 1.

FIG. 3 is a time chart illustrating an operation of the electronic control device 1. In FIG. 3, time passes from an upper part to a lower part in the drawing. In addition, in FIG. 3, processing between the components is indicated by illustrated horizontal arrows denoted by reference signs, and a solid line, a broken line, and a dashed dotted line are selectively used to clearly indicate subjects of the processing. That is, the processing starting from the HSM 20 is indicated by the solid line, the processing starting from the first system 11 is indicated by the broken line, and the processing starting from the second system 12 is indicated by the dashed dotted line.

At time t0, activation processing of the electronic control device 1 is started. First, at time t10, the communication control unit 217 of the HSM 20 transmits an interruption command for interrupting the acceptance of the communication from the outside to the communication unit 7, as communication C11. The communication unit 7 that has received this command does not accept communication from the outside of the electronic control device 1 until a cancel command is received later.

At time t20, the verification unit 211 of the HSM 20 verifies the hypervisor program 10P, confirms that there is no problem, and activates the hypervisor 10 (C12). Note that, strictly speaking, the main CPU 5 executes the hypervisor program 10P, but in FIG. 3, an arrow from the HSM 20 to the hypervisor 10 is illustrated in order to clearly indicate a causal relationship of the processing. The same applies to the following description. The hypervisor 10 is activated, and thus, the first system 11 and the like in the virtual environment provided by the hypervisor 10 can be operated.

At time t30, the verification unit 211 verifies the first system program 11P, confirms that there is no problem, and activates the first system 11 (C13). Furthermore, the verification unit 211 copies the secure boot key 251 and the signature database 253 to a region of the main RAM 6 allocated to the first system 11. In the first system 11, when the VM 111 is activated, the delegated verification unit 115 starts an operation.

At time t40, the verification unit 211 verifies the second system program 12P, confirms that there is no problem, and activates the second system 12 (C14). At time t40, the delegated verification unit 115 of the first system 11 verifies the third system program 13P and confirms that there is no problem. For this verification, the secure boot key 251 and the signature database 253 copied from the HSM 20 are used. The delegated verification unit 115 causes the main CPU 5 to execute the third system program 13P at time t45 to start the third system 13 (C21). Thereafter, the delegated verification unit 115 verifies a program for executing the fourth system or the like (not illustrated), and causes the main CPU 5 to execute this program when it is confirmed that there is no problem (C22 and C23).

The control application 123 that starts an operation after time t40 creates a message to be output to the outside, and transmits this message to the HSM 20 at time t50 (C31). In the HSM 20 that has received this message, the MAC generation unit 212 generates a MAC and transmits the MAC to the control application 123 (C15). The control application 123 controls the vehicle by using the received MAC. For example, the control application 123 transmits the message generated outside the electronic control device 1 and the MAC generated by the MAC generation unit 212 (C32).

Since the verification of all the programs to be verified has been completed, the delegated verification unit 115 of the first system 11 reports the verification completion to the HSM 20 at time t70 (C24). The verification unit 211 of the HSM 20 deletes the secure boot key 251 and the signature database 253 copied to the first system 11 (C16). The communication control unit 217 of the HSM 20 transmits a cancel command to the communication unit 7 (C17). The communication unit 7 that has received the cancel command cancels the interruption of the communication from the outside of the electronic control device 1, and enables bidirectional communication from the inside and outside of the electronic control device 1.

(Flowchart of HSM)

Figure 4:
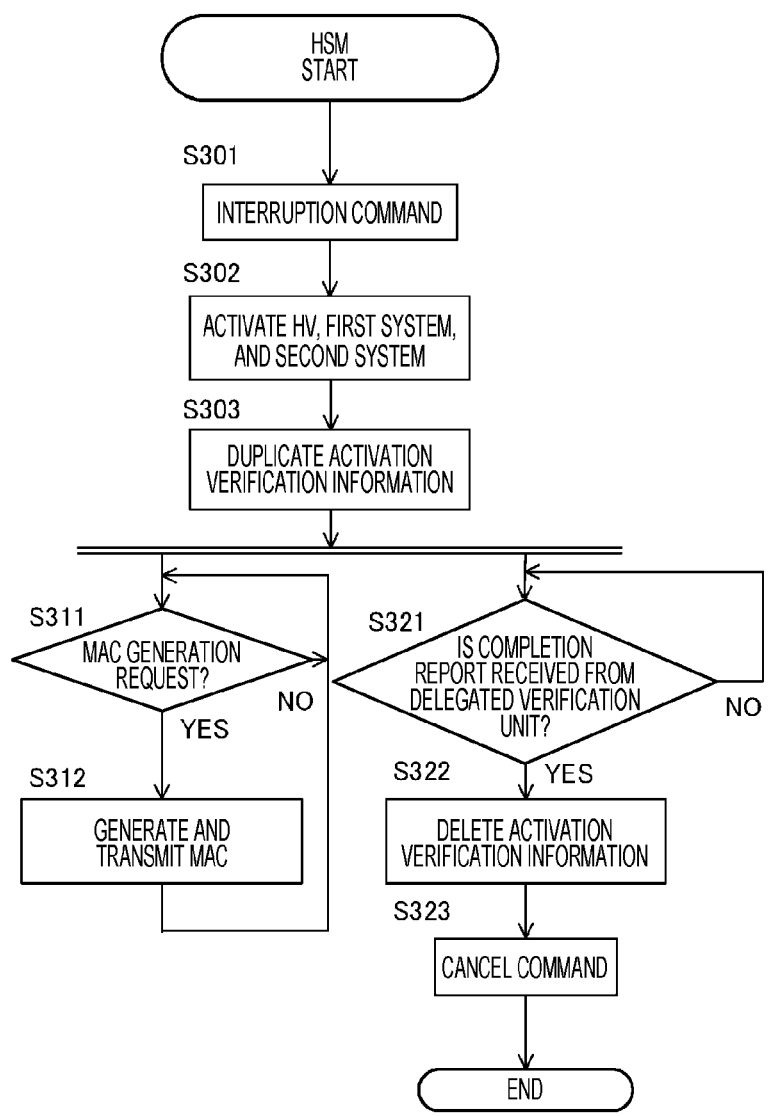
FIG. 4 is a flowchart illustrating an operation of an HSM 20.

FIG. 4 is a flowchart illustrating an operation of the HSM 20. Hereinafter, the reference signs of the corresponding processing in FIG. 3 will also be described. When the electronic control device 1 is activated, first, the communication control unit 217 of the HSM 20 outputs the interruption command to the communication unit 7 in step S301 (C11 in FIG. 3). In subsequent step S302, the verification unit 211 verifies the hypervisor 10, the first system 11, and the second system 12, confirms that there is no problem, and activates the hypervisor, the first system, and the second system (C12 to C14 in FIG. 3). In subsequent step S303, the verification unit 211 duplicates activation verification information, that is, the secure boot key 251 and the signature database 253, to a memory region of the first system 11 (C13 in FIG. 3). When the processing of step S303 is completed, the HSM 20 executes step S311 and step S321 in parallel.

In step S311, the MAC generation unit 212 of the HSM 20 determines whether or not a generation request of the MAC has been received from the inside of the electronic control device 1. For example, when a character string indicating the request for the MAC generation and a character string as a generation target of the MAC are received, the MAC generation unit 212 determines that the generation request of the MAC has been received. The MAC generation unit 212 proceeds to step S312 in a case where it is determined that the generation request of the MAC has been received, and remains in step S311 in a case where it is determined that the generation request of the MAC has not been received.

In step S312, the MAC generation unit 212 generates the MAC by using the character string as the generation target of the MAC and the MAC key 252 stored in the tamper storage unit 25, and transmits the MAC to the device that has requested the MAC generation (C15 in FIG. 3). Thereafter, the MAC generation unit 212 returns to step 311. Note that, in FIG. 4, step S311 and subsequent steps are an infinite loop without ending, but the HSM 20 may end the processing in a case where a power supply of the electronic control device 1 is turned off.

In step S312 in which the processing is started in parallel with step S311, the verification unit 211 determines whether or not a completion report has been received from the delegated verification unit 115. The verification unit 211 proceeds to step S322 in a case where it is determined that the completion report has been received, and remains in step S321 in a case where it is determined that the completion report has not been received. In step S322, the verification unit 211 deletes the activation verification information, that is, the secure boot key 251 and the signature database 253, from the memory region of the first system 11 (C16 in FIG. 3). In subsequent step S323, the communication control unit 217 transmits the cancel command to the communication unit 7 (C17 in FIG. 3), and ends the processing illustrated in FIG. 4. However, even though the processing of steps S321 to S323 is completed, the processing of steps S311 and S312 is continued.

(Flowchart of Delegated Verification Unit)

Figure 5:
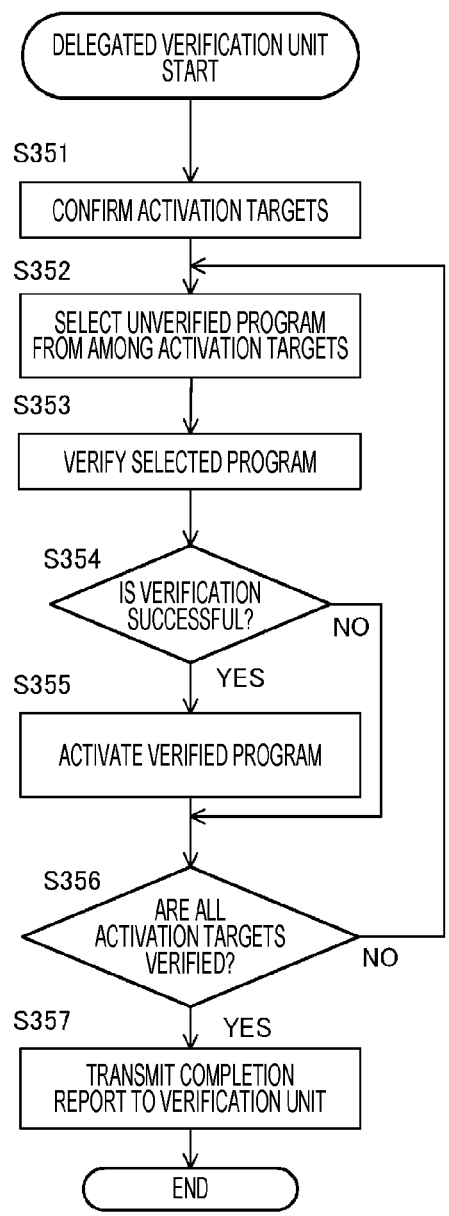
FIG. 5 is a flowchart illustrating an operation of a delegated verification unit 115.

FIG. 5 is a flowchart illustrating an operation of the delegated verification unit 115 of the first system 11. The delegated verification unit 115 first confirms activation target programs in step S351. In other words, the delegated verification unit 115 confirms a list of programs to be securely booted by the delegated verification unit 115. This list of programs is written in advance, for example, in a program that implements the delegated verification unit 115.

In subsequent step S352, the delegated verification unit 115 selects one unverified program from among the activation target programs. In subsequent step S353, the delegated verification unit 115 verifies the program selected in step S352. This verification is similar to the processing performed by the verification unit 211, and the secure boot key 251 and the signature database 253 duplicated by the verification unit 211 are used. However, although the delegated verification unit 115 uses the accelerator 215, the delegated verification unit 115 executed outside the HSM 20 cannot use the accelerator 215.

In subsequent step S354, the delegated verification unit 115 determines whether or not the verification in step S353 is successful. The delegated verification unit 115 proceeds to step S355 in a case where it is determined that the verification is successful, and proceeds to step S356 in a case where it is determined that the verification is unsuccessful. In step S355, the delegated verification unit 115 activates the program verified in step S353. In other words, the delegated verification unit 115 loads the program verified in step S353 into the main RAM 6 and causes the main CPU 5 to execute the program.

In step S356, the delegated verification unit 115 determines whether or not all the activation target programs have been verified. The delegated verification unit 115 proceeds to step S357 in a case where it is determined that all the activation target programs have been verified, and returns to step S352 in a case where it is determined that there is an unverified activation target program. In step S357, the delegated verification unit 115 transmits the completion report to the verification unit 211 and ends the processing illustrated in FIG. 5. Note that, when this completion report is received, the verification unit 211 deletes the activation verification information duplicated to the first system 11, that is, the secure boot key 251 and the signature database 253 necessary for executing secure boot, from the first system 11.

According to the aforementioned first embodiment, the following advantageous effects are obtained. (1) The electronic control device includes the tamper storage unit 25 that stores the secure boot key 251 and the MAC key 252 that is the control key, and has the tamper resistance, the main CPU 5 that is able to execute the program, the verification unit 211 that verifies the program by using the secure boot key 251, performs the secure boot causing the CPU 5 to execute the program based on the result of the verification, and has tamper resistance, the MAC generation unit 212 that performs the calculation related to encryption using the MAC key 252 that is the control key, and has tamper resistance, and the software storage unit 8 that stores the first system program 11P that implements the delegated verification unit 115 to which authority of the secure boot is delegated from the verification unit 211 and the second system program 12P that implements the control application 123 that uses the MAC generation unit 212, and does not have tamper resistance. The verification unit 211 delegates the authority of the secure boot to the delegated verification unit 115 to end the execution of the secure boot when the verification for the first system program 11P and the second system program 12P is successful and the main CPU 5 is caused to execute the first system program 11P and the second system program 12P. The MAC generation unit 212 starts an operation when the verification unit 211 ends the execution of the secure boot. The delegated verification unit 115 is able to simultaneously execute processing with the MAC generation unit 212. Therefore, the electronic control device 1 can simultaneously execute the secure boot and the MAC calculation, which is the calculation related to encryption.

(2) The verification unit 211 creates the duplication of the secure boot key 251 when the authority of the secure boot is delegated to the delegated verification unit 115, and the verification unit 211 erases the duplicated secure boot key 251 when the verification by the delegated verification unit 115 is completed. Therefore, the information necessary for the secure boot can be present outside the HSM 20 only for a minimum period.

(3) The electronic control device 1 includes the communication control unit 217 that controls the communication unit 7 that communicates with an outside and has tamper resistance. The communication control unit 217 starts the interruption of the communication from the outside before the verification unit 211 performs the secure boot (C11 in FIG. 3), and ends the interruption of the communication from the outside when the verification unit 211 erases the duplicated secure boot key 251 (C17 in FIG. 3). As described above, the electronic control device 1 interrupts the communication from the outside of the electronic control device 1 during a period in which the verification unit 211 and the delegated verification unit 115 execute secure boot. Therefore, it is possible to prevent malicious communication and intrusion of malicious software from the outside of the electronic control device 1 before the secure boot is completed, and it is possible to prevent the secure boot key 251 and the signature database 253 duplicated in the first system 11 from leaking to the outside.

(4) The first program and the second program are executed by a virtual machine running on the hypervisor 10. The verification unit 211 verifies the first system program 11P, the second system program 12P, and the hypervisor program 10P that implements the hypervisor 10 (step S302 in FIG. 4). The verification unit 211 causes the main CPU 5 to execute the first system program 11P, the second system program 12P, and the hypervisor program 10P when the verification for the first system program 11P, the second system program 12P, and the hypervisor program 10P is successful, and delegates the authority of the secure boot to the delegated verification unit 115 to end the execution of the secure boot. Therefore, in the virtual environment using the hypervisor 10 in which many targets of the secure boot are used, since it takes time to complete the secure boot, there is a large benefit in that the MAC can be generated without waiting for the completion of the secure boot.

(5) The electronic control device 1 is mounted on a vehicle. The MAC generation unit 212 generates the message authentication code for the input message by using the control key. The control application 123 uses the message authentication code output from the MAC generation unit 212 for authentication of the message in the control of the vehicle.

Modification Example 1

Figure 6:
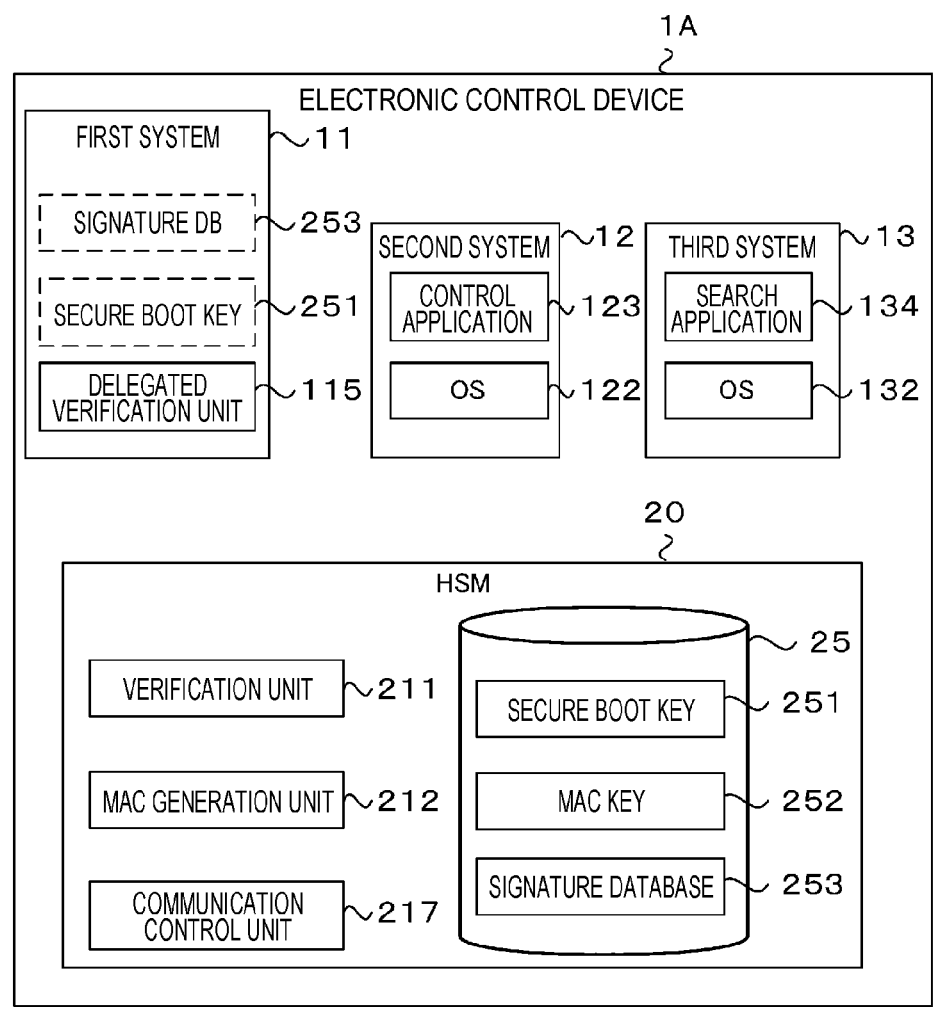
FIG. 6 is a functional configuration diagram of an electronic control device according to Modification Example 1.

In the aforementioned embodiment, the electronic control device 1 includes the hypervisor 10. However, the electronic control device may have a so-called bare-metal configuration that does not include the hypervisor 10. FIG. 6 is a functional configuration diagram of an electronic control device 1A that does not include the hypervisor. Differences from FIG. 2 in the aforementioned embodiment are that the hypervisor 10 is not provided and the first system 11 to the third system 13 do not include a virtual machine. The operation of the verification unit 211 in the present modification example is different from the operation of the embodiment in that the secure boots of the hypervisor 10 and the virtual machine is not performed. Other operations are similar to the operations of the embodiment.

Modification Example 2

In the aforementioned embodiment, the verification unit 211, the MAC generation unit 212, and the communication control unit 217 of the HSM 20 are implemented by software. However, at least one of these units may be implemented by hardware. However, even in this case, the verification unit 211 and the MAC generation unit 212 share calculation resources and cannot simultaneously execute processing.

Modification Example 3

In the aforementioned embodiment, the delegated verification unit 115 is provided only in the first system 11. However, a function equivalent to the function of the delegated verification unit 115 may be provided in another system, for example, a ninth system not described in the embodiment. In this case, the verification unit 211 performs secure boot of the ninth system subsequent to the first system 11, and the first system 11 and the ninth system perform secure boot of another program. According to the present modification example, the HSM 20 can generate the MAC while two secure boots are simultaneously executed.

Modification Example 4

In the aforementioned embodiment, the targets for which the verification unit 211 of the HSM 20 performs the secure boot are three programs of the hypervisor program 10P that implements the hypervisor 10 that provides the virtual environment, the first system program 11P that implements the first system 11 that operates the delegated verification unit 115, and the second system program 12P that implements the second system 12 that needs to start the operation at an early stage. However, the verification unit 211 may further set another program as a target of the secure boot. For example, the verification unit 211 may set, as the target of the secure boot, another program that needs to start the operation at an early stage or another program with high importance.

Modification Example 5

In the aforementioned embodiment, the processing at the time of activation of the electronic control device 1 is described. However, the similar processing may be performed not only at the time of activation when the power is switched from off to on, but also at the time of returning from a power saving state such as a sleep state.

Modification Example 6

When the delegated verification unit 115 fails to verify the secure boot of a certain program, the verification unit 211 may try the secure boot again for the program.

In the aforementioned embodiment and modification examples, the configuration of the functional block is merely an example. Some function configurations illustrated as separate functional blocks may be integrally constructed, or a configuration illustrated in one functional block diagram may be divided into two or more functions. In addition, some of the functions of each functional block may be included in another functional block.

Modification Example 7

In the aforementioned embodiment, the HSM 20 includes the MAC generation unit 212. However, the HSM 20 may be configured to perform another calculation related to encryption, for example, generate a signature, instead of the MAC generation unit 212. In addition, it is not essential for the second system 12 to include the control application 123, and the second system 12 may have any application that uses calculation related to encryption included in the HSM 20.

The aforementioned embodiment and modification examples may be combined with each other. Although various embodiments and modification examples have been described above, the present invention is not limited to these contents. Other aspects considered within the scope of the technical idea of the present invention are also included within the scope of the present invention.

REFERENCE SIGNS LIST 1, 1A electronic control device
7 communication unit
8 software storage unit
10 hypervisor
10P hypervisor program
11 first system
11P first system program
12 second system
12P second system program
13 third system
13P third system program
25 tamper storage unit
115 delegated verification unit
123 control application
211 verification unit
212 MAC generation unit
215 accelerator
217 communication control unit
251 secure boot key
252 MAC key
253 signature database
254 HSM program

The invention claimed is:

1. An electronic control device, comprising:
a tamper storage unit that stores a secure boot key and a control key, and has tamper resistance;
a processor that is able to execute a program;
a verification unit that verifies a program by using the secure boot key, performs secure boot causing the processor to execute the program based on a result of the verification, and has tamper resistance;
a calculation unit that performs calculation related to encryption using the control key, and has tamper resistance; and
a general storage unit that stores a first program that implements a delegated verification unit to which authority of the secure boot is delegated from the verification unit and a second program that implements a control unit that uses the calculation unit, and does not have tamper resistance,
wherein the verification unit delegates the authority of the secure boot to the delegated verification unit to end the execution of the secure boot when the verification for the first program and the second program is successful and the processor is caused to execute the first program and the second program,
the calculation unit starts an operation when the verification unit ends the execution of the secure boot, and
the delegated verification unit is able to simultaneously execute processing with the calculation unit.

2. The electronic control device according to claim 1, wherein the verification unit creates a duplication of the secure boot key when the authority of the secure boot is delegated to the delegated verification unit, and
the verification unit erases the duplicated secure boot key when the verification by the delegated verification unit is completed.

3. The electronic control device according to claim 2, further comprising:
a communication control unit that controls communication from an outside and has tamper resistance,
wherein the communication control unit starts interruption of the communication from the outside before the verification unit performs the secure boot, and ends the interruption of the communication from the outside when the verification unit erases the duplicated secure boot key.

4. The electronic control device according to claim 1, wherein the first program and the second program are executed by a virtual machine running on a hypervisor, and
the verification unit verifies the first program, the second program, and a hypervisor program that implements the hypervisor, causes the processor to execute the first program, the second program, and the hypervisor program when the verification for the first program, the second program, and the hypervisor program is successful, and delegates the authority of the secure boot to the delegated verification unit to end the execution of the secure boot.

5. The electronic control device according to claim 1, wherein the electronic control device is mounted on a vehicle,
the calculation unit generates a message authentication code for an input message by using the control key, and
the control unit uses the message authentication code output from the calculation unit for authentication of a message in control of the vehicle.

6. A control method executed by an electronic control device that includes a tamper storage unit that stores a secure boot key and a control key, and has tamper resistance, a processor that is able to execute a program, a verification unit that verifies a program by using the secure boot key, performs secure boot causing the processor to execute the program based on a result of the verification, and has tamper resistance, a calculation unit that performs calculation related to encryption using the control key, and has tamper resistance, and a general storage unit that stores a first program that implements a delegated verification unit to which authority of the secure boot is delegated from the verification unit and a second program that implements a control unit that uses the calculation unit, and does not have tamper resistance, the method comprising:
delegating, by the verification unit, the authority of the secure boot to the delegated verification unit to end the execution of the secure boot when the verification for the first program and the second program is successful and the processor is caused to execute the first program and the second program;

starting, by the calculation unit, an operation when the verification unit ends the execution of the secure boot; and being able to simultaneously execute, by the delegated verification unit, processing with the calculation unit.

* * * * *